US012422120B2

(12) United States Patent
Bauer et al.

(10) Patent No.: US 12,422,120 B2
(45) Date of Patent: Sep. 23, 2025

(54) LIGHT MODULE FOR A MOTOR VEHICLE HEADLIGHT, AND MOTOR VEHICLE HEADLIGHT COMPRISING SUCH A LIGHT MODULE

(71) Applicant: Marelli Automotive Lighting Reutlingen (Germany) GmbH, Reutlingen (DE)

(72) Inventors: Christina Bauer, Fellbach (DE); Dominik Wiedmaier, Herrenberg (DE)

(73) Assignee: Marelli Automotive Lighting Reutlingen (Germany) GmbH, Reutlingen (DE)

( * ) Notice: Subject to any disclaimer, the term of this patent is extended or adjusted under 35 U.S.C. 154(b) by 0 days.

(21) Appl. No.: 18/727,869

(22) PCT Filed: Jan. 11, 2023

(86) PCT No.: PCT/EP2023/050545
§ 371 (c)(1),
(2) Date: Jul. 10, 2024

(87) PCT Pub. No.: WO2023/135171
PCT Pub. Date: Jul. 20, 2023

(65) Prior Publication Data

US 2025/0102125 A1 Mar. 27, 2025

(30) Foreign Application Priority Data

Jan. 11, 2022 (DE) ..................... 10 2022 100 447.3

(51) Int. Cl.
*F21S 41/265* (2018.01)
*F21S 41/143* (2018.01)
*F21S 41/153* (2018.01)

(52) U.S. Cl.
CPC .......... *F21S 41/265* (2018.01); *F21S 41/143* (2018.01); *F21S 41/153* (2018.01)

(58) Field of Classification Search
CPC ....... F21S 41/265; F21S 41/143; F21S 41/153
(Continued)

(56) References Cited

U.S. PATENT DOCUMENTS 10,724,703 B2 * 7/2020 Nishimura ............... B60Q 1/04
11,378,244 B2 * 7/2022 Sugiyama ............. F21S 41/322
(Continued)

FOREIGN PATENT DOCUMENTS

DE 102014210500 A1 12/2015
DE 102018131027 A1 6/2020
(Continued)

OTHER PUBLICATIONS

Search Report for German Patent Application No. 102022100447.3 dated Sep. 6, 2022.
(Continued)

*Primary Examiner* — Bryon T Gyllstrom
(74) *Attorney, Agent, or Firm* — Howard & Howard Attorneys PLLC

(57) ABSTRACT

A motor vehicle headlight and light module for such a motor vehicle headlight, the light module having a plurality of light sources and a projection optical unit. The projection optical unit imaging the light emitted by the light sources as a resulting light distribution of the light module on a roadway in front of the motor vehicle. The plurality of light sources are arranged next to one another and/or one above another on a common carrier element. The projection optical unit includes a plurality of projection lenses, each assigned to a respective light source. The projection lenses are arranged offset with respect to one another in relation to a main emission direction of the light module.

5 Claims, 6 Drawing Sheets

(58) Field of Classification Search
USPC .......................................................... 362/509
See application file for complete search history.

(56) References Cited

U.S. PATENT DOCUMENTS

| | | | | |
|---|---|---|---|---|
| 11,732,855 | B2 * | 8/2023 | Han | F21S 43/243 362/219 |
| 2010/0165653 | A1 * | 7/2010 | Ookubo | F21S 41/155 362/539 |
| 2015/0219300 | A1 * | 8/2015 | Kishi | F21S 41/285 362/510 |
| 2015/0252975 | A1 * | 9/2015 | Nakada | F21S 41/265 362/521 |
| 2017/0030543 | A1 * | 2/2017 | Gromfeld | F21S 41/663 |
| 2017/0130924 | A1 * | 5/2017 | Kawai | F21S 41/47 |
| 2018/0010756 | A1 * | 1/2018 | Knittel | F21S 41/645 |
| 2021/0190282 | A1 * | 6/2021 | Grötsch | F21S 41/255 |
| 2024/0093851 | A1 * | 3/2024 | Risthaus | F21S 41/143 |

FOREIGN PATENT DOCUMENTS

| | | | |
|---|---|---|---|
| EP | 2202459 | A1 | 6/2010 |
| EP | 3124854 | A1 | 2/2017 |
| EP | 3379142 | A1 | 9/2018 |
| EP | 3835649 | A1 | 6/2021 |
| JP | 2010218964 | A | 9/2010 |
| JP | 2014137903 | A | 7/2014 |
| WO | 2014084004 | A1 | 6/2014 |

OTHER PUBLICATIONS

International Search Report and Written Opinion of the International Searching Authority for PCT/EP2023/050545 mailed Apr. 11, 2023.

* cited by examiner

LIGHT MODULE FOR A MOTOR VEHICLE HEADLIGHT, AND MOTOR VEHICLE HEADLIGHT COMPRISING SUCH A LIGHT MODULE

CROSS-REFERENCE TO RELATED APPLICATIONS

The present application is a National Stage of International Patent Application No. PCT/EP2023/050545, filed on Jan. 11, 2023, which claims priority to and all the benefits of German Patent Application No. 102022100447.3, filed on Jan. 11, 2022, the entire contents of which are hereby expressly incorporated herein by reference.

BACKGROUND OF THE INVENTION

1. Field of the Invention

The present invention relates to a light module for a motor vehicle headlight and, more specifically, to a motor vehicle headlight comprising such a light module.

2. Description of the Related Art

It is becoming increasingly common for semiconductor light sources (e.g. LEDs) that comprise one or more LED chips to be used in light modules for headlights of motor vehicles.

A plurality of light sources can be arranged next to one another and/or above one another, particularly in rows or matrix-like. The light sources can be controllable separately, individually or in groups. In this way, a plurality of partial light beams can be generated which complement or overlap one another to form the resulting light beam of the light module in order to produce the specified light distribution. This allows selected regions of the light distribution, e.g. in the region of oncoming or preceding vehicles, to be specifically blocked out. This can result in better illumination of the region in front of the motor vehicle since one can drive with the high beam more often, whereby blinding other road users is prevented since regions in which they are located can be specifically blocked out. Such light distribution is also referred to as an adaptive driving beam (ADB), glare-free high beam or partial high beam. In order to detect the position of other road users in the vicinity of a motor vehicle, the motor vehicle has suitable sensors, e.g. in the form of a camera, and suitable processing logic that determines the position of the other road users from the sensor signals and generates suitable control signals for the light module or its light sources.

EP 3 379 142 A1 discloses such a light module. It is provided that all the light sources of the light module are assigned a common projection lens.

When designing lighting devices and in particular the projection optical unit of light modules, some requirements that can be associated with the specifics of automotive vehicle construction need to be taken into consideration. On the one hand, the projection optical unit is directly visible from the outside and therefore has a significant influence on the visual impression that a viewer gets from the lighting device. Since the lighting device in turn has a strong influence on the design of a motor vehicle, when manufacturing vehicles, great importance is attached to the design of the lighting device. Accordingly, design specifications must be taken into account. In addition, the lighting devices are usually installed in the corner region of a motor vehicle, often with a strong sweep and/or inclination with respect to the vehicle's central longitudinal axis.

SUMMARY OF THE INVENTION

The object of the present invention is to improve or develop light modules known from the prior art. In particular, the light module is to be adapted to the available installation space and to design specifications.

This object is achieved by a light module having at least two light sources that are arranged next to one another and/or one above the other on a common carrier element, and a projection optical unit that includes at least two projection lenses, each assigned to a respective light source, wherein the projection lenses are arranged offset from one another with respect to a main emission direction of the light module.

The offset arrangement of the projection lenses results in a stepped arrangement. This stepped arrangement enables an adaptation of the projection optical unit to a sweep and/or inclination of the light module in an installed state in relation to a vehicle central longitudinal axis.

The light sources are, for example, arranged and designed such that light emitted by the light sources is emitted substantially in the direction of the main emission direction of the light module. For example, a light source comprises at least one LED chip, wherein a specific LED chip has an emission characteristic according to which light is emitted into a half-space, wherein a central axis runs through the center of the half-space perpendicularly to the specific LED chip in the direction of the main emission direction of the light module.

In one embodiment, the light module comprises a plurality of light sources, wherein the light sources are arranged, in particular in rows, one above the other and/or next to one another, in particular matrix-like. The light sources can be controllable separately, individually or in groups. In this way, a plurality of partial light beams can be generated, which complement or overlap one another to form the resulting light beam of the light module in order to produce the specified light distribution. This allows selected regions of the light distribution, e.g. in the region of oncoming or preceding vehicles, to be specifically blocked out. This can result in better illumination of the region in front of the motor vehicle since one can drive with the high beam more often, whereby blinding other road users is prevented since regions in which they are located can be specifically blocked out. Such light modules are referred to as multibeam LED modules or as matrix LED modules. A multibeam LED module comprises, for example, arrangements of approximately 10 to 150 light sources, in particular LED chips, arranged matrix-like. The light distribution of the light module is therefore made up of approximately 10 to 150 regions that can be blocked out or illuminated either individually or in groups.

In one embodiment, the projection lenses may be assigned to a specific light source to be arranged offset from one another in a horizontal direction and/or in a vertical direction with respect to the main emission direction of the light module. For example, projection lenses that are assigned to light sources arranged next to one another are arranged offset from one another. For example, projection lenses that are assigned to light sources arranged one above the other are arranged offset from one another. As a result, a stepping of the projection lenses can be provided both in the horizontal direction and/or vertical direction.

Furthermore, the at least two light sources, in particular a plurality of light sources, can be arranged on the common carrier element in a common plane. The light sources are arranged, for example, on a common circuit board, in particular a printed circuit board. This arrangement advantageously allows a connection of a plurality of light sources to a common heat sink. The common plane in which the plurality of light sources is arranged is, for example, a plane perpendicular to the main emission direction of the light module.

In a development of the invention, it may prove advantageous for the light module to comprise at least one optical attachment. The optical attachment is, for example, made of a solid transparent material, in particular plastic or glass. The optical attachment is used to focus the light emitted by the light source(s). The light emitted by the light source(s) is coupled into the optical attachment via one or more light entry surfaces, is deflected therein at boundaries of the optical attachment and lastly coupled out of the optical attachment via one or more light exit surfaces. Focusing the light occurs through refraction upon the entry of light and/or exit of light as well as through deflection. For example, the optical attachment transforms the light emitted by a specific light source into a light beam having a small aperture angle (less than 180°). For example, the beam direction of the light beams substantially runs in the main emission direction.

In one embodiment, each light source may be assigned a specific optical attachment or a given optical attachment element of the optical attachment. In this way, a specific optical attachment or a specific optical attachment element of the optical attachment can be individually adapted to a particular light source.

The offset arrangement of the projection lenses according to the invention results in different intersection lengths or different distances between a specific light source and the projection lens assigned thereto for specific light sources. A larger intersection length of a projection lens and the light source associated therewith results in a smaller image of the light distribution region that is generated by this light source compared to a projection lens having a smaller intersection length that is associated with another light source and the region of the light distribution generated thereby.

It can therefore prove advantageous for a particular optical attachment or a particular optical attachment element of the optical attachment to be designed in such a way that different intersection lengths of the projection lenses are compensated for. For example, a larger intersection length of a projection lens can be compensated for by an optical attachment with a larger light exit surface, and a smaller intersection length can be compensated for by an optical attachment with a smaller light exit surface. An arrangement may therefore prove advantageous in which an optical attachment to which a projection lens having a comparatively larger intersection length is assigned, comprises a larger light exit surface than an optical attachment to which a projection lens having a comparatively smaller intersection length is assigned. An optical attachment to which a projection lens having a comparatively smaller intersection length is assigned accordingly comprises a smaller light exit surface than an optical attachment to which a projection lens having a comparatively larger intersection length is assigned.

According to one embodiment of the present invention, the optical attachment or the optical attachment elements is/are designed as an integral component. This allows for easy and precise positioning of the optical attachment in relation to the light sources. For example, the optical attachment is produced in an injection molding method.

According to another embodiment, the projection optical unit, comprises at least two projection lenses, each assigned to a respective light source, and designed as an integral component. For example, the projection optical unit is produced in an injection molding method. This allows for easy and precise positioning of the projection optical unit in relation to the light sources.

Further embodiments relate to a motor vehicle headlight comprising a light module according to the described embodiments.

Further advantages can be found in the following description, the drawings and the dependent claims. It goes without saying that the above features and those to be explained below can be used not only in each specified combination, but also in other combinations or in isolation.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
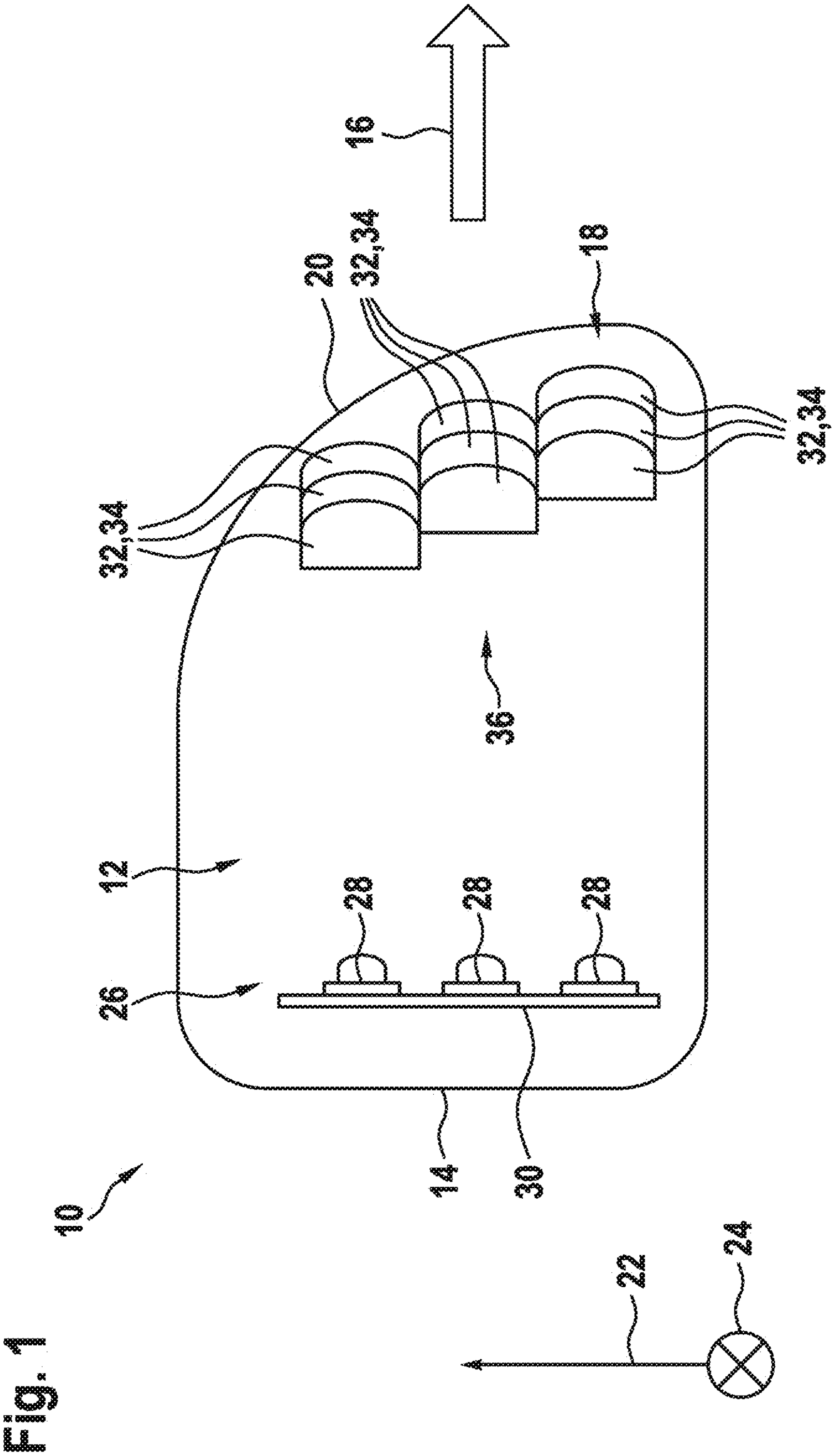
FIG. 1 shows a schematic representation of a motor vehicle headlight having a light module in a view from the side.
Figure 2:
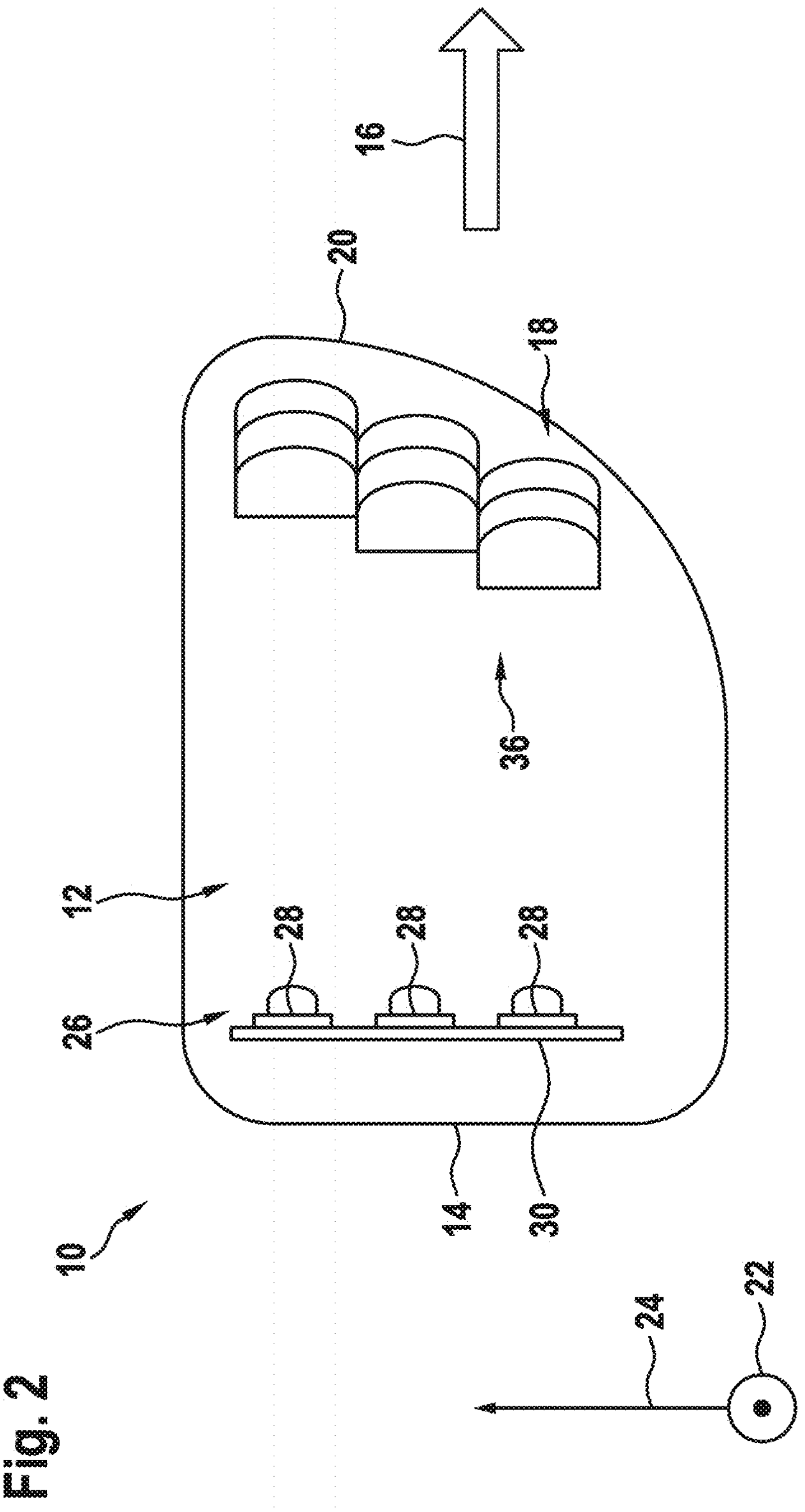
FIG. 2 shows a schematic representation of a motor vehicle headlight having a light module in a view from above.
Figure 3:
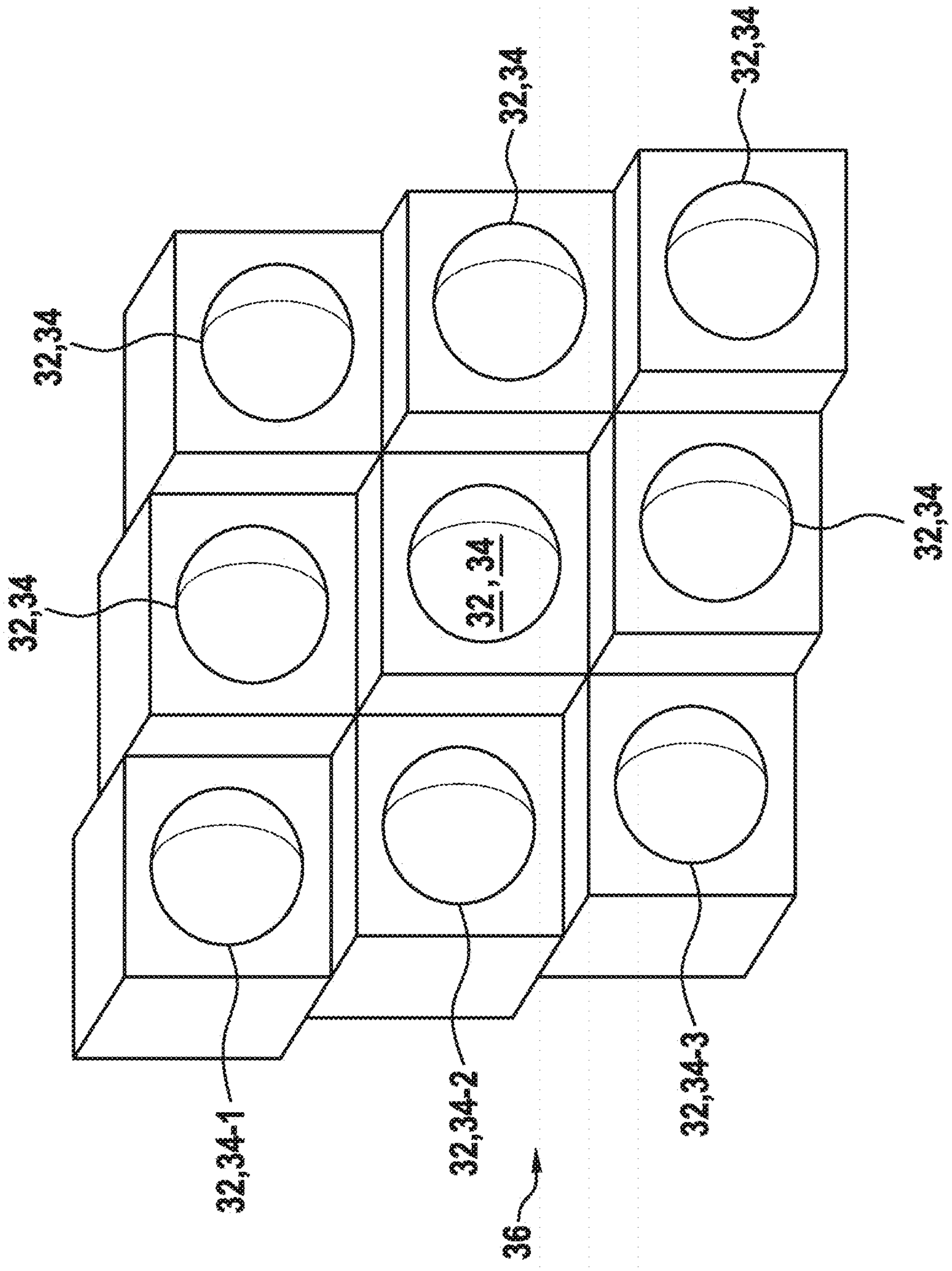
FIG. 3 shows a schematic representation of a projection optical unit of the light module from FIG. 1 or 2.

FIGS. 1 and 2 show a schematic representation of a motor vehicle headlight 10 comprising a light module 12. The headlight 10 is used to generate a predetermined light distribution. The light distribution can be any headlight function, e.g. low beam, high beam, fog light or any adaptive light distribution (e.g. partial high beam).

The headlight 10 comprises a housing 14 that includes an opaque material, in particular plastic. In a main emission direction 16 of the light module 12 or the headlight 10, the housing 14 has a light exit opening 18 which is closed by a cover plate 20. The cover plate 20 may be made of a transparent material, e.g. glass or plastic. According to the illustration, the cover plate 20 is designed without optically effective elements. However, it is also conceivable for the cover plate 20 to comprise optically effective elements.

The light module 12 arranged in the housing 14 is used to generate the light distribution of the headlight 10 or a part of the light distribution. The headlight 10 is arranged at any location on the outside, for example in the front region of the motor vehicle. The shown headlight 10 is preferably arranged on the right-hand side (on the left-hand side of the motor vehicle when looking at the motor vehicle from the front).

The arrows 22, 24 indicate a vertical direction 22 and a horizontal direction 24 in the figures. This specifies an orientation of the headlight given proper installation in a motor vehicle. A vehicle central longitudinal axis of the motor vehicle runs approximately in the direction of the main emission direction 16 or inclined thereto.

FIG. 1 shows the headlight by way of example in a view from the side. FIG. 2 shows the headlight by way of example in a view from above.

According to the shown embodiment, the light module 12 comprises a plurality of light sources 26. A particular light source 26 is, for example, a semiconductor light source and comprises, for example, an LED chip 28.

According to the example, the light sources 26 or the LED chips 28 are arranged and designed such that light emitted by the light sources 26 or the LED chips 28 is emitted substantially in the direction of the main emission direction 16. For example, a particular LED chip 28 has an emission characteristic whereby light is emitted into a half-space, wherein a central axis runs through the center of the half-space perpendicularly to the LED chip 28 in the direction of the main emission direction 16.

According to the figures, three LED chips 28 in each case are arranged next to one another, and three LED chips 28 in each case are arranged one above the other so that a matrix-like arrangement of 3×3 light sources 26 results.

This number is only an example and serves for illustration. The light module 12 is designed, for example as a multibeam LED module or as a matrix LED module and comprises, for example, arrangements of approximately 10 to 150 light sources 26 arranged like a matrix.

The light sources 26 can be separately controllable individually or in groups. In this way, a plurality of partial light beams can be generated which complement or overlap one another to form the resulting light beam of the light module 12 in order to produce the predetermined light distribution. This allows selected regions of the light distribution, e.g. in the region of oncoming or preceding vehicles, to be specifically blocked out. This can result in better illumination of the region in front of the motor vehicle since one can drive with the high beam more often, whereby blinding other road users is prevented since regions in which they are located can be specifically blocked out. In order to detect the position of other road users in the vicinity of a motor vehicle, the motor vehicle has suitable sensors (not shown), e.g. in the form of a camera, and suitable processing logic (not shown) which determines the position of the other road users from the sensor signals and generates suitable control signals for the light module 12 or its light sources 26.

Figure 4:
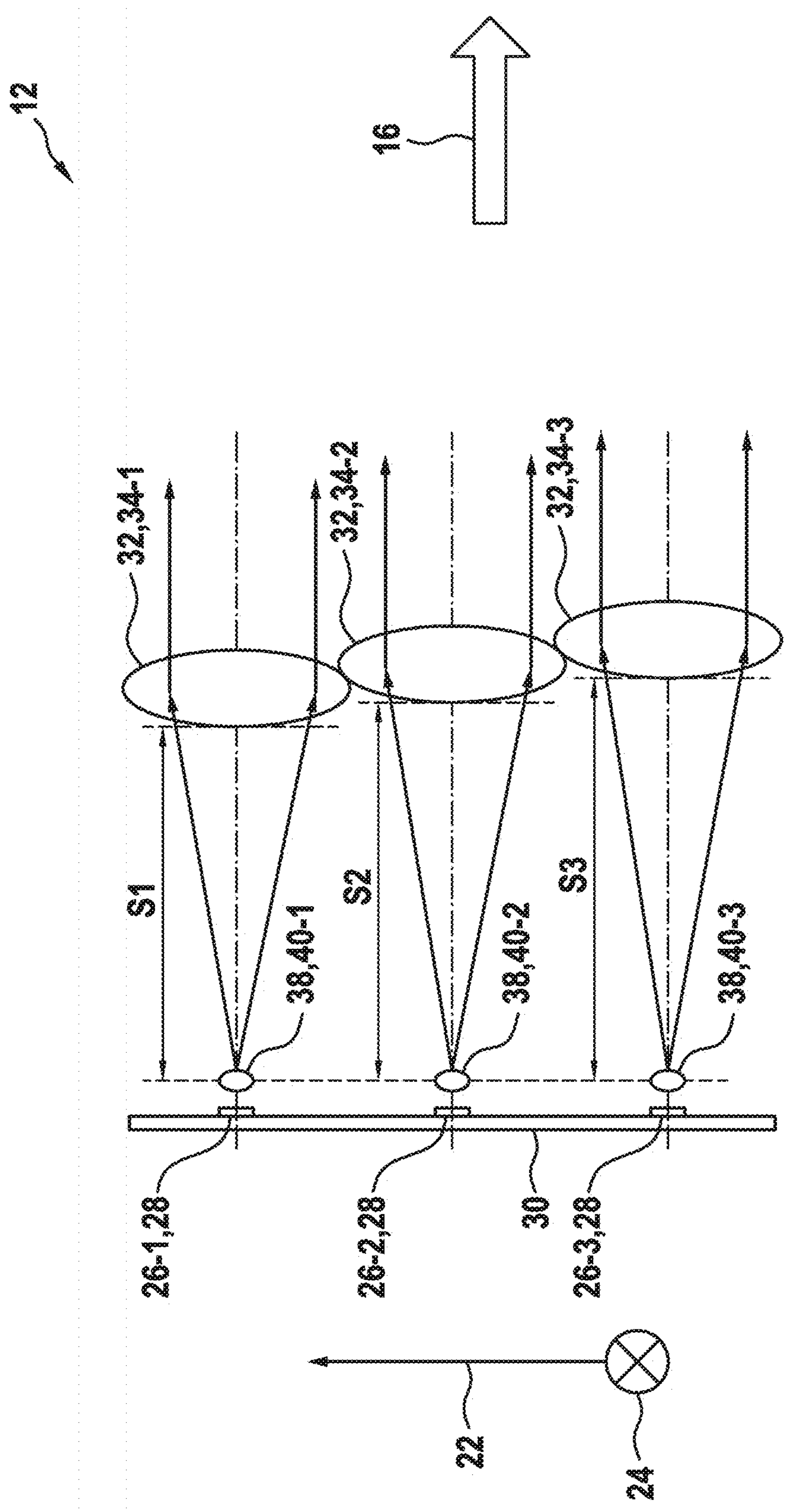
FIG. 4 shows a schematic representation of a light module from FIG. 1 or 2.
Figure 5:
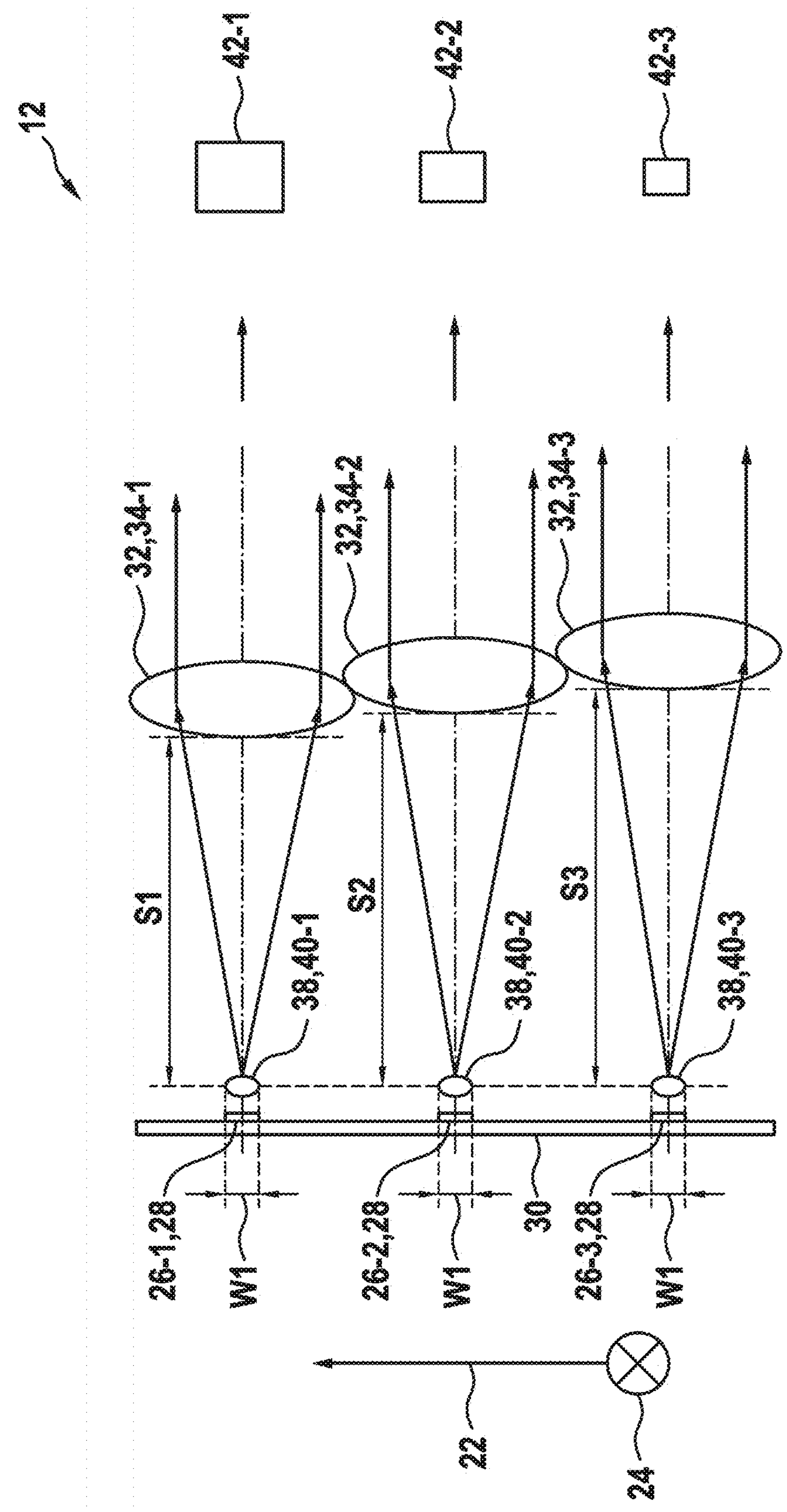
FIG. 5 shows another schematic representation of the light module from FIG. 3.
Figure 6:
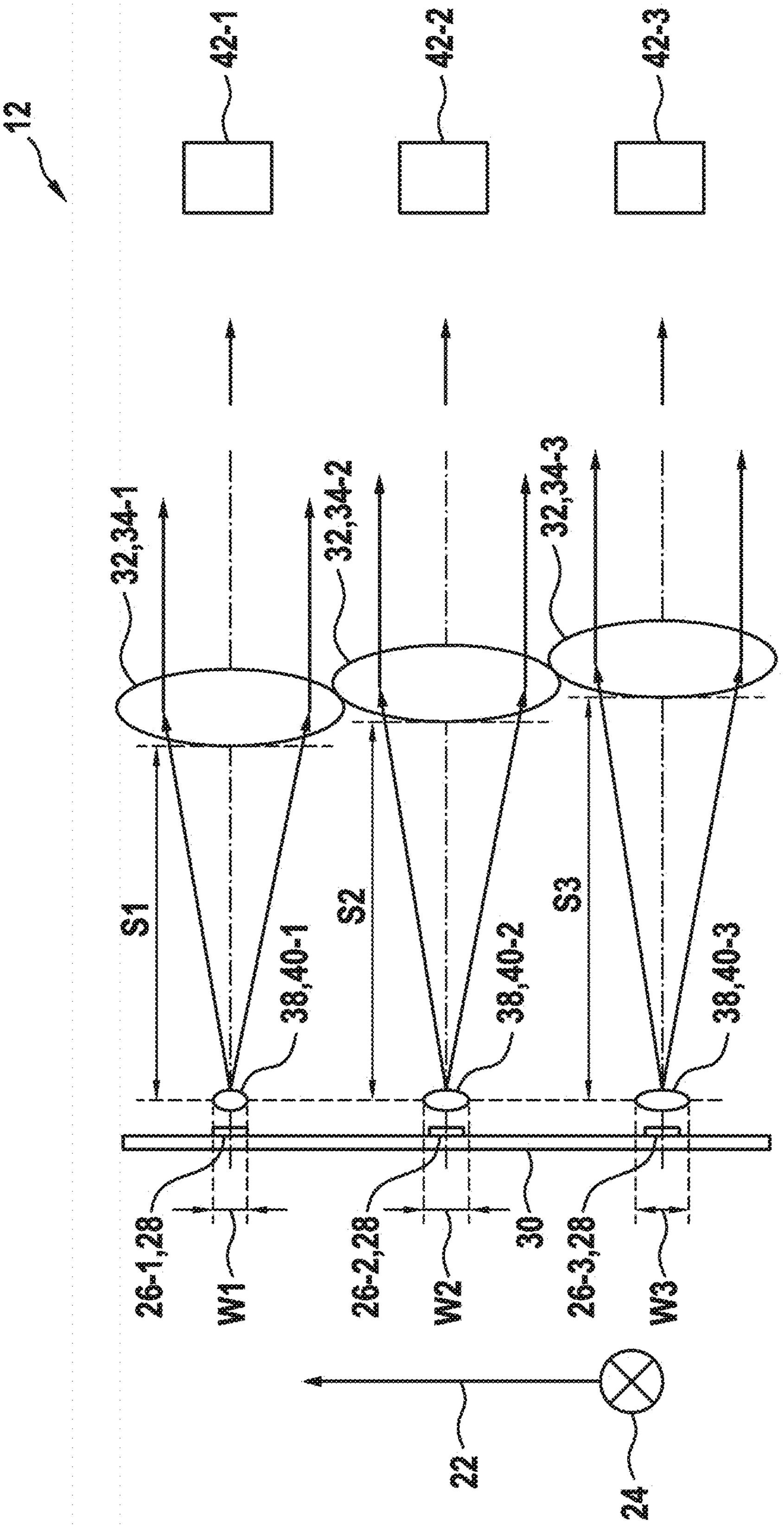
FIG. 6 shows another schematic representation of the light module from FIG. 3.

The example light distribution of the light module 12 is therefore composed of 3×3 regions that can be blocked out or illuminated individually or in groups; cf. FIGS. 4 to 6.

According to the shown embodiment, the light sources 26, in this case the nine LED chips 28, are arranged on a common carrier element 30. The carrier element 30 is, for example, a carrier plate, in particular a circuit board, in particular a printed circuit board. Due to the arrangement of the light sources 26 on the carrier element 30, the light sources 26 are arranged in a common plane. This arrangement advantageously allows a connection of a plurality of light sources 26, in particular all light sources 26, of the light module 12 to a common heat sink (not shown). In the example, the common plane in which the light sources 26 are arranged runs perpendicularly to the main emission direction 16. For example, the carrier element 30 extends in a plane perpendicularly to the main emission direction 16.

According to the shown embodiment, a projection lens 32 is assigned to a particular light source 26, 28. The projection lenses 32 are, for example, projection lens elements 34 of a projection optical unit 36.

According to the shown embodiment, the projection optical unit 36 thus comprises nine projection lenses 32 or projection lens elements 34.

The projection lenses 32 are arranged offset from one another with respect to the main emission direction 16 of the light module 12.

FIGS. 4 to 6 show schematic representations of the light module 12.

According to the illustrations, a column of three light sources 26, 28 arranged one above the other and three projection lenses 32 assigned to these light sources 26, 28 are shown.

Furthermore, FIGS. 4 to 6 show that optical attachments 38 are provided.

An optical attachment 38 is, for example, made of a solid transparent material, in particular plastic or glass. The optical attachment 38 is used to focus the light emitted by the light source(s) 26, 28. The light emitted by the light source (s) 26, 28 is coupled into the optical attachment 38 via one or more light entry surfaces, is deflected therein at boundaries of the optical attachment 38 and lastly coupled out of the optical attachment 38 via one or more light exit surfaces. Focusing the light occurs through refraction upon the entry of light and/or exit of light as well as through deflection.

According to the examples, the light sources 26 or the LED chips 28 are arranged and designed such that light emitted by the light sources 26 or the LED chips 28 is emitted substantially in the direction of the main emission direction 16. For example, a particular LED chip 28 has an emission characteristic whereby light is emitted into a half-space, wherein a central axis runs through the center of the half-space perpendicularly to the LED chip 28 in the direction of the main emission direction 16.

The optical attachment 38 transforms the light emitted by a particular light source into a light beam having a small aperture angle (less than 180°). The beam direction of the light beams substantially runs in the main emission direction.

According to the shown embodiments, each light source 26, 28 is assigned a particular optical attachment 38 or a particular optical attachment element 40. An optical attachment 38 can comprise a plurality of optical attachment elements 40. In this way, a particular optical attachment 38 or a particular optical attachment element 40 of the optical attachment 38 can be individually adapted to a particular light source 26, 28.

The illustration of the optical attachment 38 or the optical attachment elements 40 is purely schematic in FIGS. 4 to 6.

The optical attachment 38 and/or the optical attachment elements 40 of an optical attachment 38 are designed, for example, as an integral component. For example, the optical attachment 38 is produced by an injection molding method. The formation of a plurality of optical attachment elements 40 into an optical attachment 38 as a common integral component allows simple and precise positioning of the optical attachment elements 40 in relation to the light sources 26, 28.

The offset arrangement of the projection lenses 32 according to the invention results in different intersection lengths S1, S2, S3 or different distances between a particular light source 26, 28 and the projection lens 32 assigned thereto or the projection lens element 34 assigned thereto for particular light sources 26, 28; cf. FIG. 5.

For example, the arrangement of the light source 26-1 and projection lens element 34-1 has the intersection length S1.

The arrangement of the light source 26-2 and projection lens element 34-2 comprises the intersection length S2.

The arrangement of the light source 26-3 and projection lens element 34-3 has the intersection length S3.

A larger intersection length of a projection lens and the light source associated therewith results in a smaller image of the light distribution region that is generated by this light source compared to a projection lens having a smaller intersection length that is associated with another light source and the region of the light distribution generated thereby.

This is shown, for example, in FIG. 5.

The light emitted by the light source 26-1 creates the region 42-1 of the light distribution.

The light emitted by the light source 26-2 creates the region 42-2 of the light distribution.

The light emitted by the light source 26-3 creates the region 42-3 of the light distribution.

According to the embodiment shown in FIG. 5, the following applies for the intersection lengths: S1<S2<S3. Accordingly, the following applies for the regions: 42-1>42-2>42-3.

The size of the regions 42-1, 42-2, 42-3 can be influenced by adapting the particular optical attachment 38 or by adapting the particular optical attachment elements 40.

FIG. 6 shows that a particular optical attachment element 40-1, 40-2, 40-3 of the optical attachment 38 is designed such that the different intersection lengths S1, S2, S3 of the projection lens elements 34-1, 34-2, 34-3 are compensated for. For example, a larger intersection length of a projection lens can be compensated for by an optical attachment with a larger light exit surface, and a smaller intersection length can be compensated for by an optical attachment with a smaller light exit surface.

According to FIG. 6, the optical attachment element 40-1 has the width W1, and the optical attachment element 40-2 has the width W2, and the optical attachment 40-3 has the width W3. According to the illustrated embodiment, W1<W2<W3. The optical attachment element 40-3 has a larger light exit surface than the optical attachment elements 40-2 and 40-1, and the optical attachment element 40-2 has a larger light exit surface than the optical attachment element 40-1.

As a result, the influence of the intersection lengths S1, S2, S3 on the regions 42-1, 42-2 and 42-3 can be compensated for by the regions 42-1, 42-2 and 42-3 ultimately being imaged as equally large regions of the light distribution of the light module 12.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A light module for a motor vehicle headlight, the light module comprising at least ten, light sources, at least one optical attachment and a projection optical unit, the projection optical unit imaging the light emitted by the at least ten light sources as a resulting light distribution of the light module, on a roadway in front of the motor vehicle, wherein at least two of the at least ten light sources are arranged next to one another and, at least two of the at least ten light sources are arranged in a matrix one above the other on a common support element, wherein the optical attachment comprises at least ten optical attachment elements, and each one of the at least ten light sources is assigned a corresponding one of the at least ten optical attachment elements of the optical attachment, and the optical attachment with the at least ten optical attachment elements is designed as an integral component; wherein the projection optical unit includes at least ten projection lenses, each assigned to a respective one of said at least ten light sources, the projection lenses being offset with respect to one another in relation to a main emission direction of the light module, wherein each one of said at least ten projection lenses has a different intersection length, and wherein said at least ten optical attachment elements of the optical attachment compensate for the different intersection lengths of a corresponding one of the at least ten projection lenses.

2. The light module as set forth in claim 1, wherein the projection lenses assigned to a particular light source are offset from one another in a horizontal direction and/or in a vertical direction with respect to the main radiation direction of the light module.

3. The light module as set forth in claim 1, wherein the at least two light sources are arranged on the common carrier element in a common plane.

4. The light module as set forth in claim 1, wherein the projection optical unit, comprising at least two projection lenses, each assigned to a respective light source, is designed as an integral component.

5. A motor vehicle headlight comprising a light module as set forth in claim 1.

* * * * *